United States Patent [19]
Jacobson et al.

[11] 3,739,338
[45] June 12, 1973

[54] DATA COUPLING APPARATUS

[75] Inventors: Charles L. Jacobson, Pittsford; Stanley J. Zurakowski, Fairport; John Tambert, Rochester, all of N.Y.

[73] Assignee: Xerox Corporation, Stamford, Conn.

[22] Filed: July 23, 1971

[21] Appl. No.: 165,684

[52] U.S. Cl. ................ 340/147 R, 179/2 DP, 179/4
[51] Int. Cl. ........................ H04m 11/06, H04n 1/44
[58] Field of Search ............ 340/147 R; 179/2 DP, 179/2 C, 2 A, 4; 178/5.4 MC, 2, 3

[56] References Cited

UNITED STATES PATENTS

| | | | |
|---|---|---|---|
| 3,428,749 | 2/1969 | Gray | 179/4 |
| 3,507,980 | 4/1970 | Rugaber et al. | 179/4 |
| 3,549,809 | 12/1970 | Stehr | 179/2 DP |
| 3,571,798 | 3/1971 | Dawson | 178/3 X |
| 3,588,320 | 6/1971 | Guzak, Jr. | 178/2 |
| 3,586,778 | 6/1971 | Riethmeier | 179/2 C |
| 3,609,241 | 9/1971 | Riethmeier | 179/4 |
| 3,614,319 | 10/1971 | Krallinger | 179/4 |
| 3,639,904 | 2/1972 | Arulpragasam | 340/147 R |
| 3,655,915 | 4/1972 | Liberman | 179/2 DP |
| 3,524,935 | 8/1970 | Gonsewski | 179/2 DP |

*Primary Examiner*—Donald J. Yusko
*Attorney*—James J. Ralabate, Franklyn C. Weiss and John E. Beck

[57] ABSTRACT

A data device is automatically or manually connected to a communication channel to permit the communication of data over said communication channel between the data device and a remote device. Control means are provided to selectively determine an automatic or manual mode of operation. When in said automatic mode, automatic responding means responds to a signal representing a request by a remote device coupled to the communication channel to communicate with the data device for providing a communication path between the data device and the communication channel. When in said manual mode, manual responding means responds to the manual operation of switch means for providing a communication path between the data device and the communication channel. Once the communication path is established between the data device and the communication channel, irrespective of the mode of operation, enabling means is activated to initiate an operation of the data device. The present invention may be utilized for transmitting data over a conventional telephone system and is adapted to be combined with an automatic data coupling unit provided by various public telephone companies.

20 Claims, 3 Drawing Figures

Patented June 12, 1973 3,739,338

3 Sheets-Sheet 1

INVENTORS
Charles L. Jacobson
Stanley J. Zurakowski
John Tambert
BY Marn & Jangarathis
ATTORNEYS INVENTORS
Charles L. Jacobson
Stanley J. Zurakowski
John Tambert
BY Marn & Jangarathis
ATTORNEYS Patented June 12, 1973 3,739,338

3 Sheets-Sheet 3

INVENTORS
Charles L. Jacobson
Stanley J. Zurakowski
John Tambert
BY Mann & Jangarathis
ATTORNEYS

DATA COUPLING APPARATUS

This invention relates to data coupling apparatus for connecting a data device to a communication channel and, more particularly, to data coupling apparatus that enables the automatic control of a data device from a remote location as well as the manual control of said data device by an operator.

In recent years, various data devices, such as general purpose digital computers, telemetering data devices, facsimile devices, and the like, have enjoyed widespread and divers applications. Moreover, use of the public telephone system, which is a vast system of existing communication channels, for the communication of data has permitted virtually unlimited access to a data device disposed at a given location by subscribers disposed at various remote locations. Furthermore, the development of low cost, portable coupling devices has resulted in the use of a conventional telephone handset as a data terminal. For example, the transmission of data such as facsimile information over conventional telephone lines is readily achieved by acoustically coupling a conventional facsimile transceiver to a telephone line. Typical facsimile transceivers that are now widely employed in conjunction with a telephone network are the Telecopier II and Telecopier III manufactured by Xerox Corporation, the assignee of the present invention. These facsimile transceivers admit of portable characteristics such that an operator thereof may transmit facsimile information to and receive facsimile information from a similar facsimile transceiver notwithstanding the particular locations of said facsimile transceivers.

Although the technique of acoustically coupling a data device to a telephone line has been enthusiastically received, inherent disadvantages are attendant therewith. Accordingly, the use of an acoustic coupler in a noisy environment, such as a manufacturing plant or the like, has a deleterious effect upon the quality of the facsimile signal coupled to the telephone line. Similarly, received facsimile signals admitting of relatively low magnitudes are often not reproduced with the requisite fidelity. In an effort to overcome the foregoing disadvantages, automatic data coupling devices have been designed to couple data signals directly to and from a telephone line.

One such automatic data coupling device is the Bell System Data Coupler for Automatic Terminals (CBS)1001-A. This device enables a telephone system subscriber to utilize a conventional data modem (modulator/demodulator) for transmitting and receiving data over the telephone line coupled to said device. The aforementioned automatic data coupler is adapted to originate outgoing telephone calls and to answer incoming telephone calls. Also, the device is capable of modifying a modulated data signal such that the data signal is compatible with the particular characteristics of the telephone line.

Since the automatic data coupler, such as the Bell System (CBS)1001-A, is designed for universal application, it is necessary to modify the data device that is to be utilized therewith in a manner that is responsive to the operation of the automatic data coupler. It is readily apparent that various data devices that are now commercially available have not been specifically designed for use with an automatic data coupler. It is preferable therefore, to employ an interfacing arrangement between the data device and the automatic data coupler to facilitate the transmission of data to and from the data device over conventional telephone lines. It is also desirable to provide for automatic operation of the data device and the automatic data coupler, without the assistance of an operator, such that data may be transmitted to or from the data device at any time. It is recognized that this desirable feature expedites the transmission of data to a predetermined data device over conventional telephone lines during those hours when telephone traffic and tariffs are at a minimum, merely by dialing the telephone number of the station at which the data device is located. Moreover, the added capability of the interfacing arrangement for manual operation thereof enables an operator to control the operation of the data device and also allows for conventional use of the telephone lines for the transmission of verbal messages as well as the transmission of data thereover.

Therefore, it is an object of the present invention to provide data coupling apparatus for connecting a data device to a communication channel.

It is another object of the present invention to provide data coupling apparatus in combination with an automatic data coupler for transmitting and receiving data over a telephone line.

A further object of the instant invention is to provide apparatus for use with a data device whereby said data device is adapted to transmit and receive data automatically or manually.

An additional object of this invention is to provide a data coupling device that establishes a communication path between a data device and a telephone line in response to an incoming telephone call.

Yet another object of this invention is to provide a data coupling device that establishes a communication path between a data device and a telephone line in response to a manual operation.

It is another object of the present invention to provide apparatus for use with a data device and an automatic data coupler for controlling the operation of said data device and said automatic data coupler whereby data is transmitted and received by said data device.

Still another object of this invention is to provide apparatus admitting of an automatic mode of operation whereby data is selectively transmitted and received by a data device in response to a signal transmitted by a remote device, and a manual mode of operation whereby data is selectively transmitted and received by said data device under the control of an operator.

A still further object of this invention is to provide data coupling apparatus that enables data communication with an attended or unattended data device.

Various other objects and advantages of the invention will become clear from the following detailed description of an exemplary embodiment thereof and the novel features will be particularly pointed out in connection with the appended claims.

In accordance with this invention, data coupling apparatus is provided for connecting a data device to a communication channel wherein an automatic responding means responds to an interrogating signal transmitted from a remote station to connect the data device to the communication channel via a communication path; manual responding means responds to the manual operation of switch means for connecting the data device to the communication channel via said communication path; activable control means selectively establishes an automatic control mode and a manual control mode for regulating the operation of the automatic and manual responding means, respectively; and enabling means responds to the connecting of said data device to said communication channel via said communication path to enable a transmitting or receiving operation of the data device. The data coupling apparatus may be interposed between a data device and an automatic data coupler for controlling the operations thereof such that data transmission may be effected between the data device and a telephone line coupled to said automatic data coupler.

The invention will be more clearly understood by reference to the following detailed description of an exemplary embodiment thereof in conjunction with the accompanying drawings in which.

Figure 1:
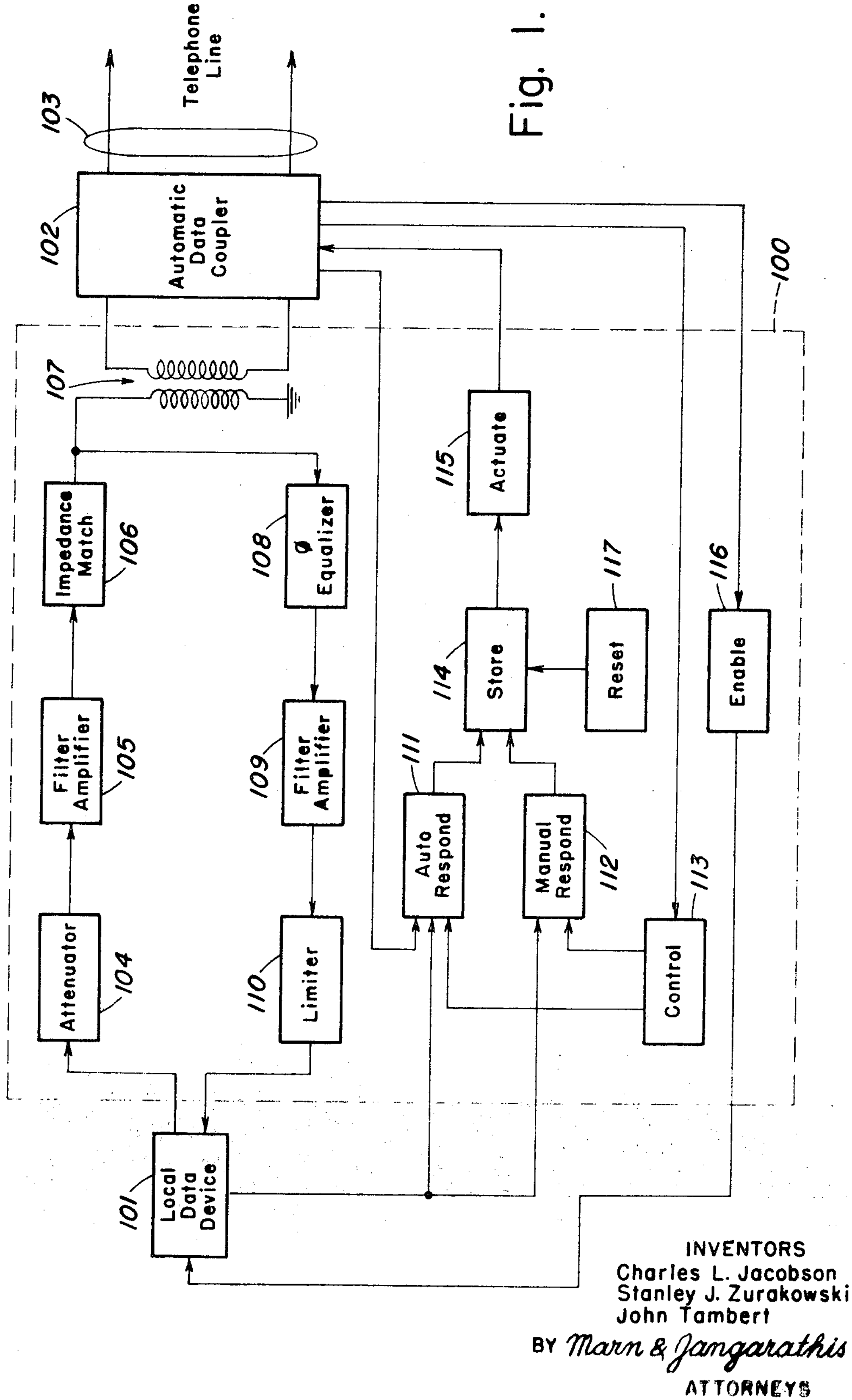
FIG. 1 is a block diagram of the present invention in combination with a data device and an automatic data coupler.

Referring now to the drawings, and in particular to FIG. 1, there is illustrated a block diagram of the present invention comprised of local data device 101, automatic data coupler 102 and data coupling apparatus 100. Local data device 101 may comprise a conventional data producing device such as a keyboard device, a punched card reader, an optical reader, a facsimile transmitter or the like. Alternatively, local data device 101 may comprise a typical read-out device such as keyboard printer, a line printer, a tape recorder, a cathode ray tube viewing device or a facsimile receiver. It should be recognized that the local data device 101 may comprise a data transceiver capable of transmitting and receiving data signals. For purposes of explanation local data device 101 may be assumed to comprise a facsimile transceiver such as a Telecopier II or Telecopier III manufactured by Xerox Corporation and adapted to selectively transmit or receive facsimile information.

Automatic data coupler 102 may be of a type similar to the Bell System Data Coupler (CBS)1001–A described in Bell System Technical Journal, August, 1970. The automatic data coupler 102 is coupled to telephone lines 103 and is adapted to transmit and receive data over the telephone lines 103, which data is appropriately modulated. It will be understood that data that is transmitted over the telephone lines 103 by automatic data coupler 102 is modulated by a suitable modulator included in local data device 101. Conversely, data that is received over telephone lines 103 by automatic data coupler 102 is demodulated by a suitable demodulator included in local data device 101. The automatic data coupler 102 is compatible with telephone lines 103 and the switching offices included in the remaining telephone system to provide proper signaling for originating outgoing telephone calls and responding to incoming telephone calls. Accordingly, automatic data coupler 102 may be provided with a conventional handset and dialing apparatus to enable an operator to seize the telephone lines 103, establish a conducting path to a remote location by appropriately dialing a predetermined telephone number and converse with a party disposed at the remote station. Incoming telephone calls that are originated by a remote station are indicated by a ringing signal. The automatic data coupler 102 is capable of assuming an off-hook mode whereby said incoming telephone call is answered and a conducting path is established between the remote station and the automatic data coupler. The automatic data coupler 102 admits of a plurality of modes of operation, each of which may be selected by a manual operation of an appropriate switch means. The following two modes of operation are turned to account by the present invention.

TALK — when in the talk mode, the automatic data coupler 102 may be utilized by an operator to verbally converse with a remote party over the telephone lines 103. An incoming telephone call may be manually answered in the conventional manner when the automatic data coupler 102 admits of its talk mode.

DATA — when in the data mode, the automatic data coupler 102 is capable of transmitting and receiving data signals over telephone lines 103. The automatic data coupler 102 may be transferred from its talk mode to its data mode in response to a manual operation thereof. An incoming telephone call may be automatically answered when the automatic data coupler 102 admits of its data mode.

Data coupling apparatus 100 is interposed between local data device 101 and automatic data coupler 102. Data coupler apparatus 100 is adapted to provide communication path between local data device 101 and automatic data coupler 102, to control the operation of local data device 101 and to actuate automatic data coupler 102 such that data signals may be transmitted over telephone lines 103. Data coupling apparatus 100 is comprised of data transmit means for providing a transmission path between local data device 101 and automatic data coupler 102 and data receive means for providing a receiving path between automatic data coupler 102 and local data device 101. The data transmit means is comprised of attenuating means 104, filter-amplifying means 105 and impedance matching means 106. Attenuating means 104 is coupled to local data device 101 and may be comprised of a conventional attenuating device such as a resistance network or the like for attenuating the magnitude of the signals transmitted thereto by local data device 101 such that the transmitted signals are compatible with the facilities of the telephone system. It is therefore recognized that attenuating means 104 may be omitted if the signals produced by local data device 101 admit of the proper magnitudes.

Attenuating means 104 is coupled to filter-amplifying means 105 which is adapted to shape the spectrum of the signals transmitted by local data device 101 in accordance with the signal requirements of the telephone system. For example if local data device 101 transmits frequency modulated data signals in the form of a frequency modulated square wave, it is appreciated that the data signals include the odd harmonics of a fundamental sinusoidal wave. It should be noted that public telephone operating companies prohibit the transmission of higher harmonics over the facilities thereof. Filter-amplifying means 105 is effective to remove the higher harmonics and to transmit the fundamental sinusoid. Accordingly, filter-amplifying means 105 may comprise a conventional active filter or a combination of a low-pass filter coupled to a conventional amplifier. The output of filter-amplifying means 105 is coupled to impedance matching means 106 adapted to match the effective impedance of the data transmit means to the impedance of automatic data coupler 102. If the present invention is to be utilized with only a single type of automatic data coupler, impedance matching means 106 may be omitted. However, it is contemplated that the apparatus in accordance with the present invention finds ready application with any automatic data coupler. Accordingly, impedance matching means 106 is necessary to match the impedance of the particular automatic data coupler utilized. Impedance matching means 106 is coupled to the primary coil of transformer 107, the secondary coil of which is coupled to automatic data coupler 102. The primary coil of transformer 107 is additionally coupled to a reference potential, such as ground, such that the transmitted and received data signals exhibit a common reference.

The data receive means is comprised of phase equalizing means 108, filter-amplifying means 109 and limiting means 110. An undesirable feature of conventional telephone lines is the inherent phase distorting characteristics thereof. The phase distortion of the telephone line varies in a non-linear manner with respect to the frequency of the signal transmitted thereover. Phase equalizing means 108 is connected to the primary coil of transformer 107 and is adapted to compensate for the non-linear phase distorting characteristics by adding a compensating non-linear phase distortion to the signals supplied thereto. Thus, although the signals received over the telephone lines 103 will be subjected to a non-linear phase distortion, the signals supplied to filter-amplifying means 109 are characterized in having a linear phase shift. Filter-amplifying means 109 is coupled to the output of phase equalizing means 108 and is similar to aforedescribed filter-amplifying means 105. Accordingly, filter-amplifying means 109 may comprise an active filter or a low-pass filter coupled to a conventional amplifier capable of eliminating unwanted noise from received data signals. In addition, filter-amplifying means 109 serves to shape the waveform of the received data signals to approximate a sinusoidal wave shape. The output of the filter-amplifying means 109 is coupled to local data device 101 via limiting means 110. Limiting means 110 may be comprised of a conventional limiting device, such as a conventional logarithmic amplifier, adapted to convert a signal admitting of sinusoidal characteristics to a signal admitting of rectangular wave shape. It should be understood that local data device 101 is adapted to operate upon rectangular wave signals.

The operation of the apparatus thus far described will now be explained. It will be assumed that automatic data coupler 102 has been actuated to its data mode, or an equivalent mode, and telephonic communication has been established with a remote station. Accordingly, a communication channel is provided between the secondary coil of transformer 107 and the telephone lines 103. The manner in which automatic data coupler 102 is actuated to its data mode is set forth in detail hereinbelow. If local data device 101 is comprised of a data transmitting device, or if the local data device is comprised of a data transceiver disposed in a transmit mode of operation, rectangular data signals transmitted thereby are reduced in magnitude by attenuating means 104. The odd harmonics of the data signals are removed by filter-amplifying means 105 and a substantially sinusoidal shaped waveform is applied to impedance matching means 106. The impedance matching means 106, which may comprise a series connected resistor, applies the sinusoidal shaped data signal across the primary coil of transformer 107. A corresponding data signal is induced across the secondary coil of transformer 107 and transmitted through automatic data coupler 102 to telephone lines 103. It is observed that the data signals applied across the primary coil of transformer 107 are capable of traversing phase equalizing means 108, filter-amplifying means 109, and limiting means 110. The transmitted data signals are thus returned to local data device 101. However, the returned data signals are not utilized by the internal circuitry of local data device 101 if said device admits of its transmit mode of operation.

If the local data device 101 is comprised of a data receiving device, or if the local data device is comprised of a data transceiver disposed in its receive mode of operation, data signals transmitted over telephone lines 103 are applied across the secondary coil of transformer 107 by automatic data coupler 102. Corresponding data signals are induced across the primary coil of transformer 107 and applied to phase equalizing means 108. The non-linear phase distortion of the received data signals are compensated by phase equalizing means 108 and data signals admitting of a linear phase shift are applied to filter-amplifying means 109. It should be noted that if telephone lines 103 do not exhibit non-linear phase distortion characteristics, such as if the telephone lines are not trunk lines, phase equalizing means 108 may be omitted. Filter-amplifying means 109 removes unwanted noise signals from the received data signals and shapes the waveform thereof to approximate a sinusoidal wave shape. Limiting means 110 converts the sinusoidal data signals to rectangular signals that are applied to local data device 101. The data signals transmitted and received by local data device 101 may be appropriately modulated rectangular signals. Accordingly, a suitable modulator may be included in local data device 101 and coupled to attenuating means 104, and a suitable demodulator may be included in the local data device and coupled to limiting means 110.

The means included in data coupling apparatus 100 that is utilized to control the operation of local data device 101 and the actuation of automatic data coupler 102 is illustrated in block form as comprising automatic responding means 111, manual responding means 112, control means 113, actuating means 115, and enabling means 116. Automatic responding means 111 is coupled to automatic data coupler 102 and is controlled by control means 113. In addition, automatic responding means 111 includes an input terminal coupled to local data device 101. Automatic responding means 111 is adapted to respond to an interrogating signal transmitted over telephone lines 103 from a remote station for actuating the automatic data coupling device whereby the operation of local data device 101 is enabled. The interrogating signal corresponds to an incoming telephone call which represents a request by a remote station to communicate with the local data device 101.

Manual responding means 112 is coupled to control means 113 and includes an input terminal coupled to local data device 101. The manual responding means 112 is responsive to a manual operation, such as the closing of a switch means, for actuating automatic data coupler 102 whereby the operation of local data device 101 is enabled. Control means 113 is adapted to selectively establish an automatic control mode and a manual control mode for the actuation of automatic data coupler 102. Control means 113 may comprise selective switching means for supplying automatic responding means 111 with a first enabling signal and manual responding means 112 with a second enabling signal. Hence, the operation of automatic responding means 111 and manual responding means 112 is selectively determined by control means 113. Moreover, the operation of automatic responding means 111 and manual responding means 112 is inhibited if local data device 101 is not capable of transmitting or receiving data.

Automatic responding means 111 and manual responding means 112 are selectively coupled to storage means 114. The storage means 114 may comprise a conventional storage device such as a storage capacitor, a register, a bistable device or the like, adapted to store an actuating signal selectively produced by automatic responding means 111 and manual responding means 112. Storage means 114 is additionally coupled to reset means 117, the latter being adapted to erase, or clear, the contents of the storage means. Accordingly, if storage means 114 comprises a storage capacitor, reset means 117 may provide a discharge path therefor. If storage means 114 comprises a register or a bistable circuit, reset means 117 may comprise conventional means for resetting the register or bistable circuit. Reset means 117 is adapted to clear the contents of storage means 114 in response to the detection of a completion of data communication. Actuating means 115 is coupled to storage means 114 and is adapted to apply the actuating signal selectively stored by storage means 114 to automatic data coupler 102. ACtuating means 115 may comprise a conventional amplifying means, gating means or the like.

Enabling means 116 is interconnected between automatic data coupler 102 and local data device 101 and serves to provide a signal to initiate a data communication once automatic data coupler 102 is actuated. Enabling means 116 may comprise a conventional amplifier, a gating circuit or the like.

In operation, an incoming telephone call is represented by a ringing signal applied across telephone lines 103. The ringing signal will be generated when a remote station effects the dialing of the telephone number corresponding to the station at which the automatic data coupler 102 is located. Thus, the ringing signal is received when a remote station desires communication with local data device 101. A signal indicative of the receipt of an incoming telephone call is applied to automatic responding means 111 by automatic data coupler 102. It should be noted that if automatic data coupler 102 is similar to the aforementioned Bell System (CBS) 1001–A, the signal will be applied to automatic responding means 111 if the automatic data coupler admits of its data mode.

The response of automatic responding means 111 to the signal applied thereto by automatic data coupler 102 is determined by control means 113. Thus, if control means 113 is disposed for automatic operation, automatic responding means 111 functions to supply storage means 114 with a first actuating signal. However, if control means 113 is disposed for manual operation, automatic responding means 111 will not be capable of responding to the signal applied thereto by automatic data coupler 102. It is recognized, therefore, that control means 113 may comprise a conventional switching device that may be preset for automatic or manual control by an operator. For the purpose of the present explanation, it will be assumed that control means 113 is disposed for automatic control and therefore automatic responding means 111 is capable of supplying a first actuating signal to storage means 114. A further signal is applied to automatic responding means 111 by local data device 101 representing the capability of the local data device to operate. This further signal is intrinsically produced by the local data device 101 when all conditions precedent to a data transmission or reception have been satisfied thereby. Thus, if control means 113 is disposed for automatic operation and local data device 101 is capable of operating, then automatic responding means 111 responds to the signal applied thereto by automatic data coupler 102 indicating the receipt of an incoming telephone call to apply a first actuating signal to storage means 114. One of ordinary skill in the art will recognize that the foregoing operation may be performed by a conventional gating circuit or the like.

The first actuating signal now stored by storage means 114 is applied to automatic data coupler 102 by actuating means 115. Automatic data coupler 102 responds to the supplied actuating signal to automatically answer the incoming telephone call and to provide a communication path between the secondary coil of transformer 107 and telephone lines 103. Thus, if automatic data coupler 102 is similar to a Bell System (CBS)1001–A, the automatic data coupler responds to the supplied actuating signal to effect an off-hook condition and to terminate the signal supplied to automatic responding means 111. The automatic data coupler 102 further responds to the actuating signal supplied thereto to apply a signal to enabling means 116 representing that the automatic data coupler has answered the incoming telephone call, i.e., an off-hook condition is obtained, and that the automatic data coupler is now prepared for a data communication. Accordingly, enabling means 116 responds to the representative signal applied thereto transmit an enabling signal to local data device 101. Enabling means 116 may therefore comprise a suitable signal generator such as an amplifier or the like such that the enabling signal generated thereby is compatible with the operating circuitry of local data device 101 to initiate the operation thereof.

Thus, it is seen that automatic responding means 111 responds to an incoming telephone call to actuate automatic data coupler 102 and to enable the local data device. If local data device 101 is adapted to transmit data signals, the enabling signal supplied thereto commences a data transmission from local data device 101 through the data transmit means to transformer 107, and from transformer 107 to telephone lines 103 via automatic data coupler 102. Similarly, if local data device 101 is adapted to receive data signals, then the enabling signal generated by enabling means 116 energizes local data device 101 to receive the data signal transmitted thereto from telephone lines 103, through automatic data coupler 102 to transformer 107, and thence through the data receive means. The termination of a data transmission is detected by reset means 117 to erase, or clear, the contents of storage means 114. Consequently, the automatic data coupler is no longer supplied with an actuating signal and, therefore, the communication path between the secondary coil of transformer 107 and telephone lines 103 is interrupted. It should be readily apparent that automatic data coupler 102 responds to the termination of the actuating signal to resume its on-hook condition which, it is recognized, corresponds to the "hanging up" of a telephone instrument. The clearing of the contents of storage means 114 results in the termination of the signal supplied to enabling means 116. Consequently, the enabling means ceases the generation of the enabling signal thereby precluding further operation of the local data device.

Since the transmission of data signals over telephone lines 103 is effected by a modulated carrier signal, it is appreciated that the termination of a data transmission may be represented by the loss of a carrier signal. Accordingly, reset means 117 may include a conventional carrier detector. Alternatively, the termination of a data transmission may be represented by a unique signal generated by the transmitting station. Reset means 117 may therefore comprise a conventional signal detecting circuit adapted to detect said unique signal. If desired, the reset means may additionally include an indicating means for providing an indication of the termination of transmission.

It is here noted that reset means 117 may include a conventional timing circuit such that the contents of storage means 114 are not erased until a predetermined time subsequent to the detection of a terminated data communication. This permits a further data communication between local data device 101 and the remote station coupled to telephone lines 103 immediately following the initial data communication. Hence, if a subsequent transmission is commenced, the contents of storage means 114 are not cleared therefrom and automatic data coupler 102 remains in its off-hook condition. Accordingly, the enabling signal generated by enabling means 116 allows for the subsequent operation of local data device 101 to execute the necessary functions thereof during the further data communication. The conclusion of the further data communication is now detected by reset means 117 whereupon the contents of storage means 114 are erased at a predetermined time thereafter. Automatic data coupler 102 then returns to its on-hook condition and enabling means 116 ceases the generation of the enabling signal.

Let it now be assumed that an operator has activated suitable switching means such that control means 113 is disposed in a manual operating mode. Accordingly, the signal previously applied to automatic responding means 111 by control means 113 is terminated and a signal is now applied to manual responding means 112 by the control means. If automatic data coupler 102 admits of its talk mode an operator may execute appropriate procedures to transfer the automatic data coupler into its off-hook condition in response to an incoming telephone call. Hence, if the automatic data coupler is similar to a Bell System (CBS)1001-A, the incoming telephone call may be "answered" and the automatic data coupler 102 may be transferred to its off-hook condition by the lifting of the telephone handset from its cradle. A communication channel is now established between the telephone handset, through automatic data coupler 102, to telephone lines 103, to the remote station. It is recognized that this communication channel may likewise be established by conventionally dialing the telephone number of the remote station. The established communication channel enables an operator to verbally converse with the remote station. If a data communication is to be commenced between the local data device 101 and the remote station, the automatic data coupler 102 is conditioned therefor, as by transferring the automatic data coupler from its talk mode to its data mode. The operator may activate a conventional switching device, such as a START switch, included in the data coupling apparatus 100. Activation of the switching device, not shown, applies an appropriate signal to manual responding means 112. If now, the local data device is capable of a data communication, the manual responding means 112 responds to the activated switching device to supply storage means 114 with a second actuating signal. It is appreciated therefore that manual responding means 112 may be similar to automatic responding means 111 and may comprise a conventional gating circuit or the like.

The actuating signal stored by storage means 114 results in an operation similar to that previously described with respect to the actuating signal produced by automatic responding means 111. Hence, further detailed description thereof need not be provided herein. Nevertheless, it should be observed that the actuating signal stored by storage means 114 is applied to automatic data coupler 102 by actuating means 115. Since the automatic data coupler has already been assumed to admit of its off-hook condition, the applied actuating signal is utilized to produce a signal representing that the automatic data coupler is prepared for a data communication. This representative signal is supplied to enabling means 116 whereby an enabling signal is generated and transmitted to local data device 101. Accordingly, if the local data device is adapted to transmit data, the transmitted data is supplied from the local data device through the data transmit means to transformer 107, through automatic data coupler 102 to telephone lines 103. Similarly, if the local data device 101 is adapted to receive data, data signal transmitted through telephone lines 103 are applied to transformer 107 by automatic data coupler 102, and through the data receive means to local data device 101. The received data signals are thus appropriately utilized by the local data device. Upon detecting the termination of data communication, reset means 117 clears the contents of storage means 114. It will be seen hereinbelow, however, that the actuating signal applied to automatic data coupler 102 is not removed therefrom when control means 113 is disposed in its manual control mode. It is appreciated, therefore, that the automatic data coupler returns to its on-hook condition by manually replacing the telephone handset thereof on its cradle. It is recalled that the contents of storage means 114 are not erased therefrom until a predetermined time subsequent to the termination of data communication. Thus, once an operator is apprised of the termination of a data communication, such as by the aforedescribed indicating means, the automatic data coupler 102 may be utilized for verbally conversing with the remote station. If the automatic data coupler is similar to the Bell System (CBS)1001-A, the talk mode of operation may be obtained following a data communication to effectuate verbal conversation. The subsequent clearing of storage means 114 by reset means 117 will not terminate the actuating signal supplied to automatic data coupler 112 and the automatic data coupler will not be returned to its on-hook condition. Consequently, a subsequent data communication may be initiated by again conditioning the automatic data coupler 102 for data communication and by operating the aforementioned switching device included in data coupling apparatus 100. Automatic data coupler 102 may then be returned to its on-hook condition by returning the handset of the automatic data coupler to its cradle.

It is noted that automatic responding means 111 and manual responding means 112 are effective to produce their respective first and second actuating signals if local data device 101 is capable of a data communication. Accordingly, each of automatic responding means 111 and manual responding means 112 may include an inhibit input terminal coupled to local data device 101. If the local data device is not capable of a data communication an intrinsic signal is generated thereby and supplied to the inhibit input terminals of automatic and manual responding means 111 and 112, respectively, to inhibit the operation thereof. Hence an actuating signal is not supplied to automatic data coupler 102 unless the local data device 101 is capable of a data communication. Consequently, automatic data coupler 102 is inhibited from automatically "answering" an incoming telephone call when local data device 101 is not capable of a data communication. Similarly, although an incoming telephone call may be manually "answered," enabling means 116 will be inhibited from generating an enabling signal if local data device 101 is not capable of a data communication.

Figure 2:
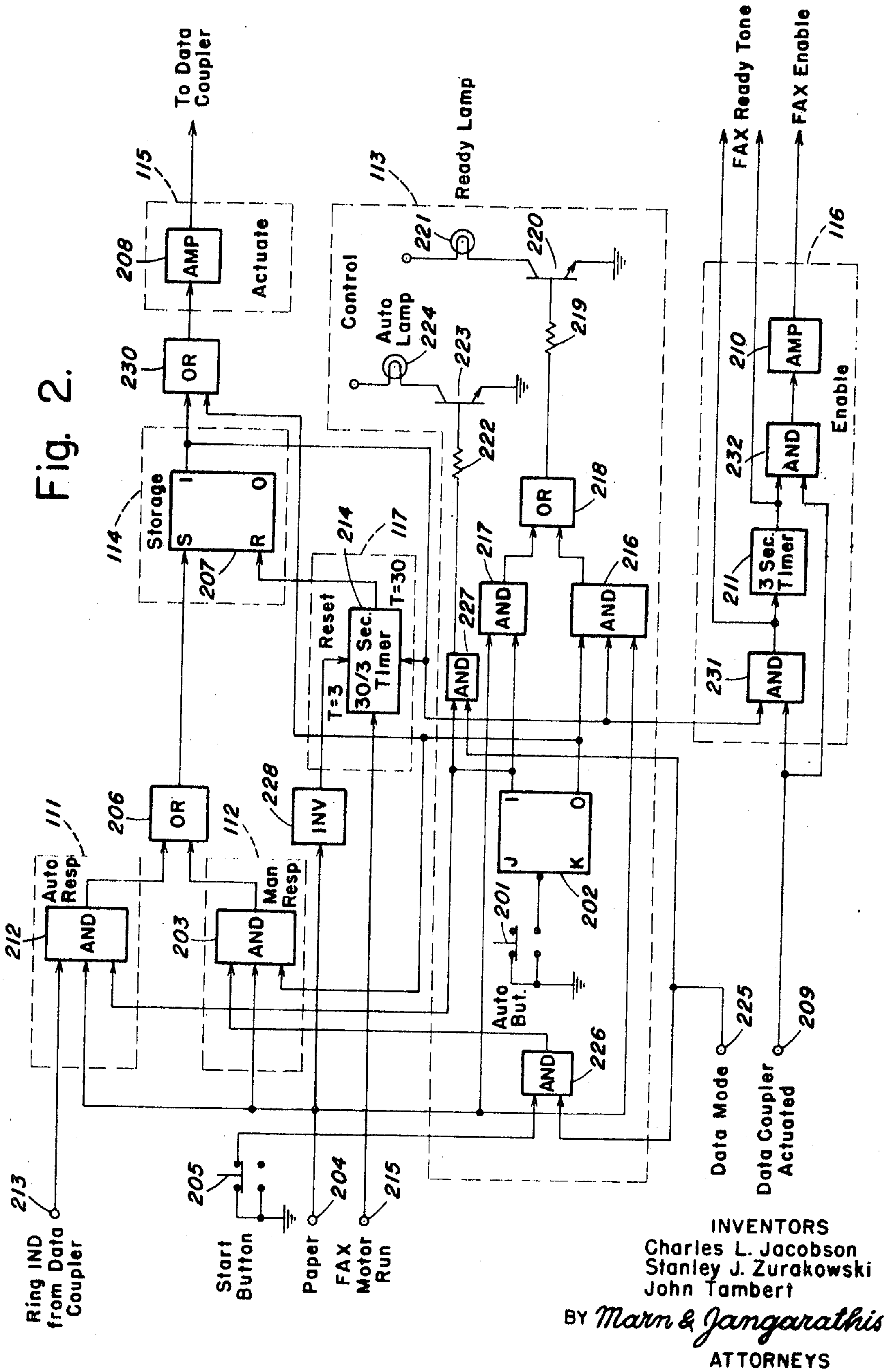
FIG. 2 is a logic diagram of a portion of the apparatus in accordance with the present invention.

A logic circuit diagram of that portion of data coupling apparatus 100 that is utilized to control the local data device and the automatic data coupler is illustrated in FIG. 2 and comprises automatic responding means 111, manual responding means 112, control means 113, storage means 114, actuating means 115, enabling means 116 and reset means 117. To facilitate a ready understanding of the present invention, the logic circuit illustrated in FIG. 2 will be described with respect to a specific example of a local data device and a specific example of an automatic data coupler. Accordingly, for the purpose of explanation, it will be assumed that the local data device is comprised of a facsimile transceiver similar to the Telecopier II or Telecopier III manufactured by Xerox Corporation and that the automatic data coupler is comprised of the Bell System (CBS)1001–A, hereinafter data coupler. The facsimile transceiver is capable of selectively transmitting and receiving facsimile information in the form of a frequency modulated carrier wave. When in its transmit mode of operation, the facsimile transceiver transmits a "ready" tone signal to a remote station prior to the transmission of facsimile information. The "ready" tone signal may be a carrier wave signal admitting of a predetermined frequency. Similarly, when in its receive mode of operation, the facsimile transceiver is capable of transmitting the "ready" tone signal to a remote transmitting facsimile transceiver to apprise the remote facsimile transceiver that facsimile information may be transmitted. The Bell System (CBS)1001–A data coupler has previously been described and, therefore, further description thereof need not be provided herein. Suffice it is to say however, the data coupler is adapted to automatically respond to an incoming telephone call when in its data mode and is capable of providing a data communication channel when in its data mode. Moreover, the data coupler may be manually transferred from its talk mode to its data mode to effect a manual operation of data communication. Furthermore, the data coupler is adapted to establish the data communication channel only when the handset thereof is appropriately removed from its cradle. Further description of the data coupler may be found in the pertinent publication previously referred to hereinabove.

Automatic responding means 111 is comprised of coincidence means 212 having a plurality of input terminals and is adapted to produce an output signal when an input signal is applied to each input terminal thereof. Coincidence means 212 may comprise a conventional combining circuit capable of combining each of the input signals applied thereto to produce an output signal. More particularly, an output signal is produced when corresponding input signals are applied in coinciding relationship. Accordingly, coincidence means 212 may comprise a conventional AND gate which, in binary notation, is capable of producing a binary "1" at the output terminal thereof when a binary "1" is applied to each input terminal thereof. For purposes of explanation, it will be assumed that a binary "1" is represented by a positive d.c. voltage level and a binary "0" is represented by a reference d.c. voltage level such as ground. It is recognized that the representative voltage levels may be interchanged for binary 1's and 0's and moreover, negative voltage levels may be utilized. Coincidence means 212, which may alternatively comprise a conventional NAND gate, includes a first input terminal coupled to terminal 213, a second input terminal coupled to terminal 204 and a third input terminal coupled to control means 113. The output terminal of coincidence means 212 is coupled to storage means 114 via a conventional selective combining circuit 206, such as an OR circuit or the like.

Manual responding means 112 is similar to the automatic responding means 111 and comprises coincidence means 203 including a first input terminal coupled to terminal 204, a second input terminal coupled to control means 113 and a third input terminal coupled to control means 113 and, as will be seen, responsive to manually operable switch means 205. The output terminal of coincidence means 203 is coupled to storage means 114 via the OR circuit 206. Switch means 205 is capable of providing an appropriate binary signal to coincidence means 203 in response to the manual operation thereof. The switch means may comprise a conventional two-position switch such as a toggle switch, a single pole single throw switch, a relay locking switch, a push-button switch or the like. In the illustrated embodiment, switch means 205 is comprised of a spring loaded push-button switch, designated START switch, including two pairs of contacts. In its normal quiescent position, switch means 205 provides a connection between one pair of contacts and in its operated, or depressed position, switching means 205 provides a connection between the second pair of contacts. One contact of each pair of contacts is connected to ground and the other contact of the first pair of contacts is connected to the third input terminal of coincidence means 203 via coincidence means 226 included in control means 113. The remaining contact of the second pair of contacts is not connected to further means.

Storage means 114 is comprised of a conventional bistable multivibrator such as flip-flop means 207 having set and reset input terminals and one and zero output terminals. It is recognized that a binary "1" applied to the set input terminal of flip-flop means 207 is effective to set the flip-flop means into its "one" state whereby a binary "1" is provided at the one output terminal thereof. Similarly, a binary "1" applied to the reset input terminal of flip-flop means 207 is effective to reset the flip-flop means into its "zero" state whereby a binary "0" is provided at the one output terminal thereof. The one output terminal of flip-flop means 207 is connected to actuating means 115, which is here indicated as a conventional amplifying circuit 208, via OR circuit 230. The output of the amplifying circuit 208 is connected to the data coupler.

The one output terminal of flip-flop means 207 is additionally coupled to reset means 117 which is comprised of a variable timing circuit 214. Variable timing circuit 214 includes an inhibit input terminal coupled to a terminal 215 whereby the operation of the variable timing circuit 214 is inhibited when a binary "1" is applied to terminal 215. The variable timing circuit 214 is adapted to produce a binary "1" at the output terminal thereof when a binary "1" is applied to the first or second input terminals thereof at first or second predetermined times subsequent to the application of a binary "0" to the inhibit input terminal thereof. For purposes of description only, the first and second predetermined times may, for example, be 30 seconds and 3 seconds, respectively. Thus, the first input terminal of variable timing means 214 is coupled to the one output terminal of flip-flop means 207 and the second input terminal of variable timing means 214 is coupled to terminal 204 via inverting means 228. The variable timing circuit 214 may comprise a conventional timing device such as a binary counter, an R-C timing circuit or the like. Inverting means 228 is capable of performing a logic negation on a binary signal applied to the input terminal thereof. Accordingly, inverting means 228 may comprise a conventional logic circuit adapted to produce binary "0" in response to a binary "1" applied thereto and conversely, to produce a binary "1" in response to an applied binary "0."

Control means 113 is comprised of bistate means 202, activating means 201, coincidence means 216 and 217, and indicating means 221 and 224. Bistate means 202 may comprise a triggerable bistable multivibrator, such as J-K flip-flop circuit or the like, including a trigger input terminal, a one output terminal and a zero output terminal. The bistate means is adapted to assume first and second output states in response to pulse signals applied to the trigger input terminal thereof. Accordingly, a first applied pulse will activate bistate means 202 into its first output state and a second applied pulse will activate the bistate means into its second output state. It is recognized that successively applied pulses will continue to alternately activate the bistate means 202 into its first and second output states. Activating means 201 is adapted to produce the pulses capable of selectively activating the bistate means 202 and may comprise a conventional two-position switch similar to aforedescribed switch means 205. Accordingly, a first contact of each pair of contacts of switch means 201 is connected to ground and a second contact of one of said pairs of contacts is connected to the trigger input terminal of bistate means 202. It is observed that in its normal quiescent state, switch means 201 does not couple the trigger input terminal of bistate means 202 to ground, whereas in its operated state, switch means 201 connects the trigger input terminal to ground. It should be recognized that the contacts of switch means 201 as well as the contact of switch means 205 may be interchanged if desired. Moreover, those contacts of the switch means that are connected to ground may alternatively be coupled to a source of energizing potential.

The output terminal of bistate means 202 is coupled to the third input terminal of coincidence means 212 and, in addition, to a first input terminal of coincidence means 217. Coincidence means 217 is similar to aforedescribed coincidence means 212 and includes a second input terminal coupled to terminal 204. The output terminal of coincidence means 217 is coupled to the control, or base, electrode of transistor means 220 via OR circuit 218 and series connected current limiting resistance means 219. The output terminal of bistate means 202 is additionally coupled to the control, or base, electrode of transistor means 223 via coincidence means 227 and series connected to current limiting resistance means 222. The output terminals of transistor means 223 are connected in series relationship with AUTO lamp 224 and ground. AUTO lamp 224 is additionally connected to a source of energizing potential +V. Transistor means 223 serves to perform a switching function in response to a binary "1" applied to the control, or base, electrode thereof and therefore may be replaced by other conventional switching means well known to those of ordinary skill in the art. Transistor means 223 may comprise a conventional NPN, PNP, or FET transistor. The control, or base, electrode of transistor means 223 is coupled to the output terminal of coincidence means 227, the other input terminal of which is coupled to terminal 225.

The zero output terminal of bistate means 202 is coupled to the second input terminal of coincidence means 203 and in addition to a first input terminal of coincidence means 216. Coincidence means 216 is similar to aforedescribed coincidence means 212 and includes a second input terminal coupled to terminal 204 and a third input terminal coupled to the one output terminal of flip-flop means 207. The output terminal of coincidence means 216 is coupled to the control, or base, electrode of transistor means 220 via OR circuit 218 and series connected current limiting resistance means 219. OR circuit 218 is similar to aforedescribed OR circuit 206 and serves to apply a binary "1" produced by coincidence means 216 or a binary "1" produced by coincidence means 217 to the control, or base, electrode of transistor means 220. The output terminals of transistor means 220 are connected in series relationship with READY lamp 221 and ground. READY lamp 221 is additionally coupled to a source of energizing potential +V. Transistor means 220 is similar to aforementioned transistor means 223 and is capable of performing a switching function. Accordingly, the transistor means 220 may be replaced by other conventional switching devices. The zero output terminal of bistate means 202 is further coupled to an additional input terminal of OR circuit 230, the output terminal of which is connected to amplifying circuit 208.

Enabling means 116 is comprised of amplifying means 210, timing means 211 and coincidence means 231 and 232. Amplifying means 210 may comprise a conventional amplifying circuit such as a d.c. amplifier and includes an output terminal coupled to the control circuitry of a facsimile transceiver. Timing means 211 may comprise a conventional timing circuit such as a binary counter, an R-C timing circuit, or the like, and is adapted to provide an output signal at a determined period of time subsequent to the application of an input signal thereto. The output terminal of timing means 211 is connected to the control circuitry of the facsimile transceiver. For purposes of illustration only it will be assumed that the determined time interval established by timing circuit 211 is approximately three seconds. Coincidence means 231 includes a first input terminal coupled to terminal 209 and a second input terminal coupled to the one output terminal of flip-flop means 207. Coincidence means 231 is coupled at its output terminal to timing means 211 which, in turn, is coupled to an input terminal of coincidence means 232. The latter coincidence means includes an input terminal thereof coupled to terminal 209 and an output terminal coupled to amplifying means 210.

Terminal 204 is coupled to the facsimile transceiver and is capable of receiving an appropriate binary signal representing the capability of the facsimile transceiver to transmit or receive facsimile information. Hence, if the facsimile transceiver is provided with a suitable supply of paper upon which facsimile information is recorded, or if the facsimile transceiver is properly loaded with an original document, a binary "1" is applied to terminal 204. Terminal 209 is coupled to the date coupler and is adapted to receive a binary "1" when the date coupler is actuated. The binary signal applied to terminal 209 is intrinsically generated by the control circuitry of the data coupler. Terminal 213 is also coupled to the data coupler whereby a signal generated by the data coupler representing that an incoming telephone call has been detected, i.e., a ringing signal has been applied to the data coupler, may be supplied thereto. Terminal 215 is coupled to the facsimile transceiver and is capable of receiving an appropriate binary signal during a facsimile transmission. More particularly, the motor included in the facsimile transceiver is operated during a facsimile transmission or reception and is de-energized at the completion of a facsimile transmission or reception. The signal applied to terminal 215 is indicative of the operation of the facsimile transceiver motor. Terminal 225 is coupled to the data coupler and serves to receive an appropriate signal when the handset of the data coupler has been removed from its cradle and the automatic data coupler admits of its data mode. The purpose of this signal is described in detail hereinbelow.

The operation of logic circuit illustrated in FIG. 2 will now be described. An operator may select the particular mode of operation desired, i.e., automatic (unattended) or manual (attended) by appropriately actuating AUTO switch 201. In its quiescent state, a binary "1" is applied by AUTO switch 201 to the trigger input terminal of bistate means 202. Upon depressing AUTO switch 201, ground potential, which corresponds to a binary "0," is applied to the trigger input terminal. Upon releasing the AUTO switch 201, the quiescent state thereof is restored and a binary "1" is again applied to the trigger input terminal of bistate means 202. Consequently, a pulse is applied to the trigger input terminal thereof and the bistate means 202 may obtain its "one" or "zero" output state. If the "one" output state is assumed, a binary "1" is applied by the one output terminal of bistate means 202 to the input terminal of coincidence means 227. It will soon be described that terminal 225 is provided with a binary "1." Hence, coincidence means 227 supplies a binary "1" to the control, or base, electrode of a transistor means 223. The binary "1" applied thereto is effective to activate transistor means 223 into its conducting state whereby current is permitted to flow therethrough. Hence, current flows from the source of energizing potential +V, through AUTO lamp 224, across the collector-emitter junction of transistor means 223 to ground. Accordingly, AUTO lamp 224 admits of a constant illumination indicating that bistate means 202 has assumed its "one" output state. It should be observed that the "one" output state assumed by bistate means 202 corresponds to an automatic mode of operation. If a manual operation is desired, the subsequent actuation of AUTO switch 201 is effective to activate bistate means 202 into its "zero" output state. It is clear that transistor means 223 will assume its nonconducting state and the AUTO lamp 224 will not be illuminated. Hence, the "zero" output state of bistate means 202 corresponds to a manual mode of operation. A subsequent operation of AUTO switch 201 however, applies a subsequent pulse to the trigger input terminal of the bistate means 202 to establish an automatic mode of operation. Thus, it is seen that an operator may initiate a desired mode of operation, which mode is indicated by the selective illumination of AUTO lamp 224.

In the automatic mode of operation, the handset of the data coupler is normally removed from its cradle and the data coupler is disposed in its data mode. Accordingly, the switch hook included in the data coupler is elevated and the aforedescribed binary "1" is applied to terminal 225. Should the handset of the data coupler be placed in its cradle, a binary "0" is applied to terminal 225. Should this condition obtain, coincidence means 227 is supplied with a binary "0" and the binary "1" provided at the one output terminal of bistate means 202 will not be effective to supply transistor means 223 with a binary "1." Thus, coincidence means 227 produces a binary "0." Transistor means 223 will therefore remain in its non-conducting state. Hence, AUTO lamp 224 will not be illuminated. It is observed, therefore, that the successive operation of auto button 201 will be effective to activate bistate means 202 but an appropriate indication thereof will not be provided by AUTO lamp 224.

If the facsimile transceiver is capable of transmitting or receiving facsimile information, a binary "1" will be applied to terminal 204. Accordingly, each input terminal of coincidence means 217 is supplied with a binary "1" and the coincidence means is effective to produce a binary "1" which is applied through OR circuit 218 to the control, or base, electrode of transistor means 220. Transistor means 220 is thus energized into its conducting state and current flows from the source of energizing potential +V, through READY lamp 221, across the collector-emitter junction of transistor means 220 to ground. READY lamp 221 is therefore illuminated to provide an indication that the illustrated apparatus is now prepared for a data communication. It is noted that the illumination of AUTO lamp 224 and the illumination of READY lamp 221 indicates that the facsimile transceiver is capable of transmitting or receiving facsimile information without the assistance of an operator. If the data coupler admits of its data mode, an incoming telephone call will be detected and the data coupler will apply a binary "1" to terminal 213. Accordingly, coincidence means 212 will responds to the binary "1" applied to each input terminal thereof to supply a binary "1" through OR circuit 206 to the set input terminal of flip-flop means 207. It is observed that the binary "0" provided at the zero output terminal of bistate means 202 is effective to disable the operation of coincidence means 203. The binary "1" applied to the set input terminal of flip-flop means 207 is stored by the flip-flop whereby said flip-flop means is set to its "one" output state. As is appreciated, flip-flop means 207 provides a binary "1" at its one output terminal which is supplied to the data coupler by OR circuit 230 and amplifying means 208 as an actuating signal therefor. The binary "1" is also supplied to the first input terminal of variable timing means 214.

The actuating signal supplied to the data coupler is effective to actuate the data coupler to assume an off-hook condition whereby the incoming telephone call is answered. The actuating signal is utilized whereby the data coupler applies a binary "1" to terminal 209 indicating that the data coupler has been properly actuated. The binary "1" applied to terminal 209 is combined in coincidence means 231 with the binary "1" provided by flip-flop means 207 to result in a binary "1" that is supplied to the "ready" tone generator included in the facsimile transceiver. The binary "1" produced by coincidence means 231 additionally energizes timing means 211. At the conclusion of a period of time determined by the timing means, a binary "1" is supplied thereby to coincidence means 232 and, in addition, to the "ready" tone generator of the facsimile transceiver. Coincidence means 232 receives the binary "1" provided at terminal 209 to produce a binary "1" that is suitably amplified by amplifying means 210 and applied to the facsimile transceiver. If the facsimile transceiver admits of its transmit mode of operation, the amplified signal applied by amplifying means 210 is effective to energize the motor of the facsimile transceiver. Moreover, the binary "1" produced by coincidence means 231 serves to energize the "ready" tone generator and the binary "1" produced by timing means 211 serves to de-energize the "ready" tone generator. Consequently, a "ready" tone is transmitted to the remote calling station for a duration determined by timing means 211 and the motor included in the facsimile transceiver commences operation. Moreover, an appropriate inhibit signal is supplied terminal 215 and thence to the inhibit input terminal of variable timing means 214. It is recognized that the "ready" tone is transmitted over the data transmit means, transformer 107, data coupler 102, and telephone lines 103 previously described with respect to FIG. 1. At the conclusion of an interval of time determined by timing means 211, the timing means applies a binary "1" to appropriate circuitry in the facsimile transceiver which, in its transmit mode of operation, interrupts the "ready" tone and facsimile information is transmitted.

If the facsimile transceiver admits of its receive mode of operation, the amplified signal supplied to the facsimile transceiver by amplifying means 210 is effective to enable the facsimile transceiver motor to be energized in response to received synchronizing signals. In the receive mode, however, the "ready" tone will not be transmitted by the facsimile transceiver until timing means 211 supplies a binary "1" to the appropriate facsimile transceiver circuitry. Hence, in accordance with the assumed example, the facsimile transceiver will transmit a "ready" tone to the facsimile transceiver disposed at the remote calling station approximately three seconds after the data coupler responds to the incoming telephone call. The remote facsimile transceiver responds to the received "ready" tone to transmit synchronizing signals and facsimile information over telephone lines 103, through data coupler 102, to transformer 107, through the data receive means to be received by the facsimile transceiver. It is noted that the suitable circuitry included in the facsimile transceiver and coupled to the amplifying means 210 and timing means 211 forms no part per se of the present invention. Such circuitry is well known to those of ordinary skill in the art and is included in the Telecopier II or Telecopier III facsimile transceiver manufactured by Xerox Corporation.

At the conclusion of the facsimile transmission or reception, the facsimile transceiver motor is de-energized and the signal applied to terminal 215 exhibits a transition from a binary "1" to a binary "0." The facsimile transceiver motor may be de-energized in response to an "end-of-transmission" signal transmitted to the facsimile transceiver by a remote transmitting facsimile station or when a complete document has been scanned by the facsimile transceiver. Accordingly, the inhibit signal previously applied to the inhibit input terminal of variable timing means 214 is removed therefrom. The variable timing means 214 is thus capable of responding to the binary "1" applied to the first input terminal thereof to produce a binary "1" at the output terminal thereof at the aforementioned first predetermined time. In accordance with the previously assumed example, a binary "1" is applied to the reset input terminal of flip-flop means 207 30 seconds after the completion of a facsimile communication. Flip-flop means 207 is thus reset to its "zero" state and a binary "0" is applied thereby to the variable timing means 214 and to amplifying means 208 via OR circuit 230. It is appreciated therefore that the stored binary "1" is cleared from the flip-flop means 207 to terminate the actuating signal previously applied to the data coupler. The termination of the actuating signal deactuates the data coupler which resumes its on-hook condition. The foregoing operation may again be performed in response to a subsequent incoming telephone call.

If, during a facsimile transmission or reception, the facsimile transceiver is no longer capable of a data communication, such as, for example, if the facsimile transceiver is no longer provided with an adequate supply of paper or the end of an original document is scanned, a binary "0" is applied to both terminals 204 and 215. The binary "0" supplied to terminal 204 is applied by inverting means 228 to the second input terminal of variable timing means 214 as a binary "1." A binary "1" applied to this input terminal is effective to energize the variable timing means 214 notwithstanding the signal applied to the first input terminal thereof. Hence, in accordance with the assumed example, a binary "1" is applied to the reset input terminal of flip-flop means 207 3 seconds after a loss of paper. Consequently the data coupler is deactuated and returns to its on-hook condition.

If a manual mode of operation is desired, AUTO switch 201 is depressed by an operator to supply a pulse to the trigger input terminal of bistate means 202. The bistate means is thus triggered from its "one" output state to its "zero" output state. Accordingly, a binary "0" is provided at the one output terminal thereof and AUTO lamp 224 is extinguished. If the operation of AUTO switch 201 causes illumination of AUTO lamp 224, the AUTO switch should again be depressed to extinguish the AUTO lamp and to establish the manual mode. A binary "1" is thus provided at the zero output terminal of bistate means 202, and is supplied to the first input terminal of coincidence means 203 and to amplifying means 208 via OR circuit 230. If the data coupler is in its talk mode, an incoming telephone call is detected and the incoming telephone call may be answered by an operator in the conventional manner, i.e., by removing the data coupler handset from its cradle.

Upon answering the incoming telephone call, the operator may verbally converse with the remote calling station. It is readily apparent that a telephone call may be initiated by the operator by appropriately operating the dialing mechanism included in the data coupler. In either event, if it is determined that a facsimile transmission or reception is to be initiated, the operator transfers the data coupler from its talk mode to its data mode and the handset thereof is not returned to its cradle. Should the data coupler handset be returned to its cradle the established telephone connection will be interrupted.

The manual operation of START switch 205 applies a binary "1" to the third input terminal of coincidence means 203. If the facsimile transceiver is adequately supplied with paper for the transmission or reception of facsimile information, a binary "1" is applied to terminal 204. Accordingly, coincidence means 203 is now activated to apply a binary "1" to the set input terminal of flip-flop means 207 via OR circuit 206. A condition precedent to the transmission of data by the data coupler requires the data coupler handset to be properly removed from its cradle. If this condition is not satisfied, a binary "0" is applied to terminal 225 and thence to coincidence means 226. Hence, a binary "0" is applied to the third input terminal of coincidence means 203 regardless of the operation of START switch 205.

The binary "1" applied to the set input terminal of flip-flop means 207 when bistate means 202 has been activated to establish the manual mode of operation, an adequate supply of paper is provided in the facsimile transceiver, the data coupler handset is properly removed from its cradle and the START switch 205 is depressed, is stored by the flip-flop means. Amplifying means 208, however, responds to the binary "1" provided at the zero output terminal of bistate means 202 and coupled thereto by OR circuit 230 to apply an actuating signal to the data coupler. Appropriate circuitry included in the data coupler responds to the applied actuating signal and to the data mode assumed by the data coupler to establish a communication path between the secondary coil of transformer 107 and the telephone lines 103 of FIG. 1, and in addition to apply binary "1" to terminal 209. The binary "1" provided at the one output terminal of flip-flop means 207 is applied to coincidence means 216 together with the binary "1" applied to terminal 204 and the binary "1" provided at the zero output terminal of bistate means 202. Accordingly, a binary "1" is applied to the control, or base, electrode of transistor means 220 by coincidence means 216 via OR circuit 218. Transistor means 220 is thus activated to its conducting state and current flows from the source of energizing potential +V, through READY lamp 221, across the collector-emitter junction of transistor means 220 to ground. The READY lamp 221 is therefore illuminated to apprise the operator of the ability of the facsimile transceiver to transmit or receive facsimile information. The binary "1" applied to terminal 209 is combined in coincidence means 231 with the binary "1" provided by flip-flop means 207 to result in an appropriate signal that activates timing means 211. At the conclusion of a determined interval, timing means 211 produces a binary "1" that is combined in coincidence means 232 with the binary "1" provided at terminal 209 to produce a binary "1" that is amplified by amplifying means 210 and supplied as an enabling signal to the facsimile transceiver. It is appreciated therefore that the facsimile transceiver motor may now be energized to commence operation. An appropriate inhibit signal is thus supplied to terminal 215 and thence to the inhibit input terminal of variable timing means 214. If the facsimile transceiver is disposed in its transmit mode, the binary "1" applied thereto coincidence means 231 results in the transmission of the "ready" tone from the facsimile transceiver to the remote station. At the conclusion of the time interval determined by timing means 211 a binary "1" is supplied thereby to the facsimile transceiver to interrupt the "ready" tone. In accordance with the previously assumed example, the ready tone signal is interrupted and facsimile information is transmitted by the facsimile transceiver 3 seconds after the operation of START switch 205. The facsimile information is transmitted through the data transmit means to the transformer 107, through the data coupler 102 to telephone lines 103 and thence to the remote station. Alternatively, if the facsimile transceiver is disposed in its receive mode and is adapted to receive facsimile information, the enabling signal supplied by amplifying means 210 enables the facsimile transceiver motor to be energized in response to received synchronizing signals and the binary "1" produced by timing means 211 is effective to initiate the transmission of the "ready" tone from the facsimile transceiver to the remote station. It is recalled that synchronizing signals and facsimile information will be received by the facsimile transceiver from the remote station after the "ready" tone is detected by the remote station. The facsimile information transmitted by the remote station is received over telephone lines 103, through the data coupler 102, to the transformer 107, thence through the data receive means to the facsimile transceiver.

When a facsimile transmission or reception is completed, the facsimile transceiver motor is de-energized and the signal applied to terminal 215 exhibits a transition from a binary "1" to a binary "0." Variable timing means 214 is no longer inhibited from responding to the binary "1" applied to the first input terminal thereof and subsequently provides a binary "1" at its output terminal. Flip-flop means 207 is thus reset to its "zero" state thirty seconds subsequent to the termination of a facsimile communication. When flip-flop means 207 is reset to its "zero" state, coincidence means 216 is deactivated in response thereto. Transistor means 220 is thus restored to its non-conducting state and READY lamp 221 is extinguished to apprise the operator of the deactuation of the data coupler. The data coupler maintains its off-hook condition because the binary "1" supplied to the amplifying means 208 from bistate means 202 via OR circuit 230 supports the actuating signal.

When the facsimile communication is terminated, an end of message lamp, soon to be described, is illuminated to appropriately apprise the operator. It is recognized that a predetermined period of time, i.e., 30 seconds in accordance with the previously assumed example, is now available during which further action may be taken before the enabling signal is terminated. Accordingly, the data coupler may be manually transferred to its talk mode to enable the operator to verbally converse with the remote station. As noted above, the resetting of flip-flop means 207 to its "zero" output state does not result in the deactuation of the data coupler when bistate means 202 establishes a manual mode of operation. If a subsequent facsimile communication is desired, the data coupler is manually transferred to its data mode and the foregoing operation of the illustrated apparatus is repeated.

It is observed that in the manual mode of operation, as in the aforedescribed automatic mode of operation, READY lamp 221 will not be illuminated if the facsimile transceiver is not capable of transmitting or receiving facsimile information. Accordingly, if the facsimile transceiver is not provided with an adequate supply of paper for receiving facsimile information or with a document for transmitting facsimile information, a binary "0" is applied to terminal 204 and coincidence means 216 produces a binary "0." Accordingly, the control, or base, electrode of transistor means 220 is supplied by OR circuit 218 with a binary "0." It is also noted that if during a facsimile transmission or reception in the manual mode, the facsimile transceiver loses its capability to transmit or receive, a binary "0" is applied to terminal 204. The binary "0" is inverted by inverting means 228 and a binary "1" is applied to the second input terminal of variable timing means 214. It is recalled that a binary "1" applied to the second input terminal of the variable timing means is effective to reset flip-flop means 207 to its "zero" state at a second predetermined period of time notwithstanding the signal applied to the inhibit input terminal of the variable timing means. Accordingly, consistent with the previously assumed example, the data coupler will be automatically deactuated three seconds after the capability of the facsimile transceiver to communicate has been lost if the automatic mode of operation is established by bistate means 202. The data coupler is then returned to its on-hook condition. In either the automatic or manual mode the resetting of flip-flop means 207 to its "zero" state is effective to terminate the enabling signal produced by amplifying means 210, thereby de-energizing the facsimile transceiver motor.

As has been previously described, coincidence means 203 and 212 include input terminals coupled to terminal 204. These input terminals function to inhibit the respective coincidence means from producing the resultant actuating signal when the facsimile transceiver is not capable of transmitting or receiving facsimile information. Hence, a binary "0" applied to terminal 204 produces a binary "0" at each of the output terminals of coincidence means 203 and 212. It should be appreciated that the capability of the facsimile transceiver to transmit or receive facsimile information is not solely dependent on an adequate supply of paper therein. Accordingly, a binary "0" is applied to terminal 204 when any of the conditions prerequisite for a facsimile communication by the facsimile transceiver has not been satisfied. Furthermore, it is possible that the facsimile transceiver and the data coupling apparatus of the present invention may be readily adapted for facsimile communication, but the data coupler is not properly conditioned therefor. In this event, amplifying means 210 and timing means 211 are constrained from initiating a facsimile communication because the necessary signal therefor will not be applied to the terminal 209 by the data coupler.

Figure 3:
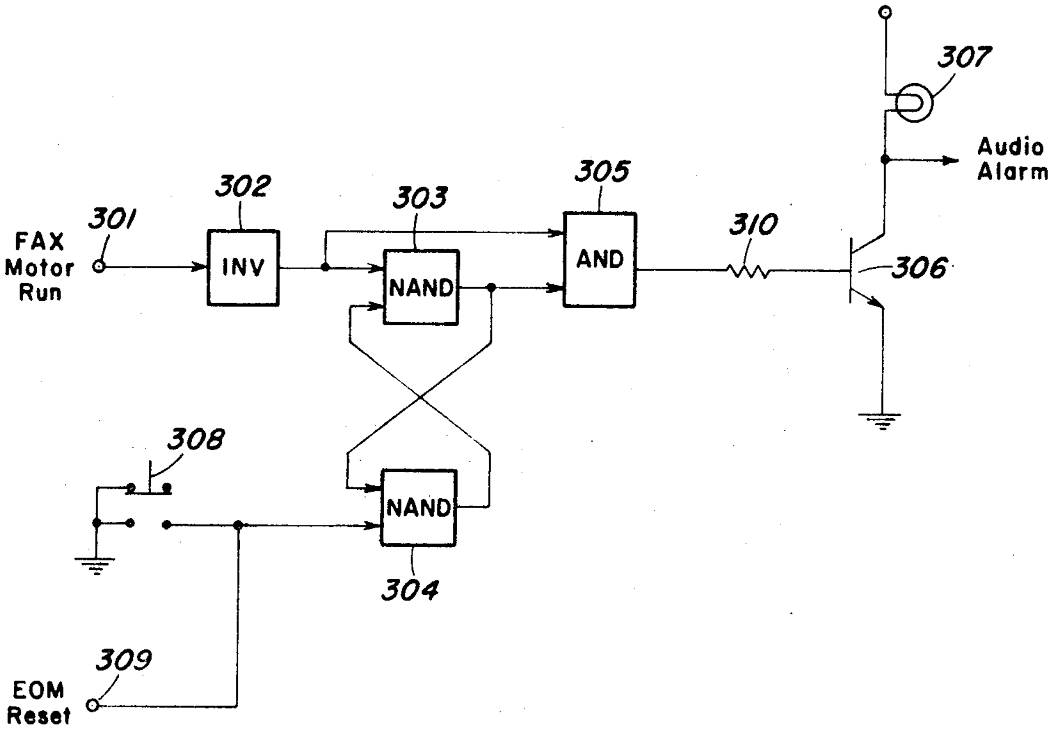
FIG. 3 is a logic diagram of another portion of the apparatus of the present invention.

The aforedescribed indication of the completion of a facsimile communication is provided by the apparatus illustrated in FIG. 3 which comprises NAND gates 303 and 304, coincidence means 305 and lamp 307. NAND gates 303 and 304 are interconnected in a conventional manner to form a flip-flop circuit. It will be appreciated that other readily available flip-flop circuits, such as aforedescribed flip-flop means 207, may be utilized herein. As is understood by those of ordinary skill in the prior art, a NAND gate is similar to a coincidence circuit and is adapted to produce a binary "0" at the output terminal thereof in response to a binary "1" supplied to each input terminal thereof. Conversely, a binary "1" is produced in response to a binary "0" applied to any one input terminal thereof. NAND gate 303 includes an input terminal coupled to terminal 301 via inverting means 302. The inverting means 302 is similar to aforedescribed inverting means 228. The output terminal of inverting means 302 and the output terminal of NAND gate 303 are coupled to respective input terminals of coincidence means 305. An input terminal of NAND gate 304 is connected in common relationship to switch means 308 and to terminal 309. Switch means 308 is similar to aforedescribed means 201 and may comprise a single pole single throw switch, a spring loaded push-button switch or the like. One contact of each pair of contacts of the switch means 308 is connected to ground and the other contact of one of the pairs of contacts is connected to the input terminal of NAND gate 304.

The output terminal of coincidence means 305 is coupled by a current limiting resistance means 310 to the control, or base, electrode of transistor means 306. The output terminals of transistor means 306 are connected in series relationship with lamp means 307 and ground. Transistor means 306 is additionally coupled to an audio alarm circuit, not shown. Lamp means 307 is further connected to a source of energizing potential +V. The transistor means 306 is adapted to perform a switching function and therefore may comprise an NPN, PNP or FET transistor, or the like. Alternatively, transistor means 306 may be replaced by other conventional switching devices.

In operation, a facsimile communication is initiated by the energizing of the facsimile transceiver motor by amplifying means 210 previously described with respect to FIG. 2. Control circuitry included in the facsimile transceiver responds to the energization of the motor to apply a binary "1" to terminal 301. The binary "1" is inverted by inverting means 302 and applied as a binary "0" to the input terminal of NAND gate 303. Accordingly, a binary "1" is produced by NAND gate 303 and applied to coincidence means 305. The binary "1" is additionally intercoupled to an input terminal of NAND gate 304. If switch means 308 assumes its illustrated position and if terminal 309 is not provided with a binary "0," NAND gate 304 will be supplied with a binary "1" at each input terminal thereof to produce a binary "0" at its output terminal.

It is observed that coincidence means 305 will be supplied with a binary "1" by NAND gate 303 and a binary "0" by inverting means 302. Hence, transistor means 306 is provided with a binary "0" at its control, or base, electrode and assumes its non-conducting state.

At the completion of the facsimile communication, the facsimile transceiver motor is de-energized and appropriate circuitry applies a binary "0" to terminal 301. Inverting means 302 therefore supplies NAND gate 303 and coincidence means 305 with a binary "1." It is recognized that the binary "1" applied to NAND gate 303 does not affect the output signal produced thereby because NAND gate 304 continues to supply a binary "0" to the input terminal of NAND gate 303 connected thereto. Consequently, coincidence means 305 now detects a binary "1" at each input terminal thereof and a binary "1" is supplied to the control, or base, electrode of transistor means 306. The transistor means is thus activated to its conducting state and current flows from the source of energizing potential +V, through lamp means 307, across the collector-emitter junction of transistor means 306 to ground. Lamp means 307 is now illuminated to apprise an operator of the completion of a facsimile communication. In addition, an indication of the conducting state of transistor means 306 is applied to the audio alarm circuit not shown, to produce an audible tone. The completion of a facsimile communication is therefore indicated by a visual and an audible indication. Should a subsequent facsimile communication ensue terminal 301 is supplied with a binary "1" in response to the energization of the motor, and inverting means 302 applies a binary "0" to coincidence means 305 to extinguish lamp means 307.

The foregoing indications may be extinguished by a manual operation of switch means 308. It is observed that if switch means 308 is depressed, an input terminal of NAND gate 304 is coupled to ground. This is equivalent to applying a binary "0" to the input terminal whereby NAND gate 304 produces a binary "1" at its output terminal. The binary "1" is intercoupled to NAND gate 303 which is now supplied with a binary "1" at each input terminal thereof. Consequently, NAND gate 303 supplies a binary "0" to coincidence means 305 which results in the de-energization of transistor means 306. Hence, transistor means 306 returns to its non-conducting state and the illumination of lamp means 307 is extinguished. Furthermore, the audible tone generated by the audio alarm circuit not shown, is terminated. It is recognized that the signal produced by NAND gate 303 may be switched to a binary "0" and the output signal produced by NAND gate 304 may be switched to a binary "1" if a binary "0" is applied to terminal 309. Terminal 309 is coupled to the facsimile transceiver such that the circuitry included in the facsimile transceiver applies a binary "0" to terminal 309 in response to a predetermined operator initiated action. For example, if facsimile transceiver is similar to a Telecopier II or Telecopier III, a binary "0" is applied to terminal 309 when the facsimile "paper" door thereof is opened. Thus, it is seen that an indication of the completion of a facsimile communication is obtained only in response to the energization and subsequent de-energization of the facsimile transceiver motor. The indication may be extinguished only as a consequence of operator initiated action or if a subsequent communication obtains. Thus, if the data coupling apparatus in accordance with the present invention is operated in its automatic mode an indication of the completion of a facsimile communication will be provided until the logic circuit illustrated in FIG. 3 is reset by an operator.

While the invention has been particularly shown and described with reference to a particular embodiment thereof, it will be obvious to those of ordinary skill in the art that the present invention admits of general application with any conventional data device. The use of the data coupling apparatus is not limited solely to a facsimile transceiver. Accordingly, any type of data may be transmitted between two subscribers over conventional telephone lines wherein each subscriber is provided with the data coupling apparatus of the present invention. Moreover, although the instant invention has been particularly adapted for use with an automatic data coupler, it is readily apparent that data communication may obtain over a conventional communication channel without the use of an automatic data coupler. Hence, the invention may be utilized in conjunction with first and second stations connected by suitable conducting means other than a conventional public telephone system.

It is further recognized that the present invention is not limited to the particular circuit components described and illustrated herein. Accordingly, the coincidence means may comprise AND gates, NAND gates or the like. In addition, the bistate means and flip-flop means may be any conventional bistable circuit device. Moreover, each lamp means may be combined with its associated switch means in a common unitary structure well known to the prior art. Therefore, the foregoing and various other changes and modifications in form and details may be made without departing from the spirit and scope of the invention. Consequently, it is intended that the appended claims be interpreted as including all such changes and modifications.

What is claimed is:

1. In combination with an automatic data coupling device for transmitting and receiving data over a telephone line, said automatic data coupling device being actuable to provide a data communication channel to said telephone line, apparatus interposed between a local data station and said automatic data coupling device for regulating the data communication between said local data station and a remote station, comprising:

data transmit means interconnected between said local data station and said automatic data coupling device for providing a transmission path between said local data station and said automatic data coupling device for the transmission of data from said local data station;

data receive means interconnected between said automatic data coupling device and said local data station for providing a receiving path between said automatic data coupling device and said local data station for the reception of data by said local data station;

control means adapted to be preset by a manual operation thereof for selectively establishing an automatic control mode and a manual control mode for data communication;

automatic responding means coupled to said automatic data coupling device and responsive to an interrogating signal transmitted from said remote station for actuating said automatic data coupling device to enable said automatic data coupling device to establish a communication path between said local data station and said remote station when an automatic control mode is established, manual responding means coupled to said automatic data coupling device and responsive to a manual operation of switch means for actuating said automatic data coupling device to enable said automatic data coupling device to establish a communication path between said local data station and said remote station when a manual control mode is established, and enable means responsive to the actuation of said automatic data coupling device by said automatic responding means or said manual responding means for supplying said local data station with an enabling signal to initiate the operation of said local data station.

2. The combination of claim 1 wherein said control means comprises:

bistate means admitting of a first state for providing a first signal representing an automatic control mode and a second state for providing a second signal representing a manual control mode;

activating means coupled to said bistate means for selectively activating said bistate means into said first and second states; and indicating means coupled to said bistate means for providing a first indication when said bistate means admits of said first state and a second indication when said bistate means admits of said second state.

3. The combination of claim 2 wherein said automatic responding means comprises:

first combining means coupled to said automatic data coupling device and said bistate means for combining a signal generated by said automatic data coupling device representing a request by said remote station for communication with said local data station and said first signal to produce a first actuating signal; and means for supplying said first actuating signal to said automatic data coupling device.

4. The combination of claim 3 wherein said manual responding means comprises:

second combining means coupled to manually operable switch means and said bistate means for combining a signal generated by said manually operable switch means and said second signal to produce a second actuating signal; and means for supplying said second actuating signal to said automatic data coupling device.

5. The combination of claim 4 wherein said means for supplying said first actuating signal to said automatic data coupling device and said means for supplying said second actuating signal to said automatic data coupling device comprise:

storage means for selectively storing said first and second actuating signals;

means coupled to said first and second combining means for selectively supplying said storage means with said first and second actuating signals;

means coupled to said storage means for supplying said selectively stored first and second actuating signals to said automatic data coupling device; and reset means for clearing said selectively stored first and second actuating signals from said storage means.

6. The combination of claim 5 wherein said reset means comprises:

detecting means for detecting the termination of a data communication between said local data station and said remote station; and timing means responsive to a detected termination of a data communication for applying a reset signal to said storage means at a predetermined time subsequent to said detected termination, thereby deactuating said automatic data coupling device.

7. The combination of claim 6 including means for applying an additional actuating signal to said automatic data coupling device when said bistate means admits of said second state whereby said additional actuating signal inhibits the deactuation of said automatic data coupling device when said storage means is cleared.

8. The combination of claim 7 further including inhibit means coupled to said first and second combining means for inhibiting the operation of said first and second combining means when said local data station is not capable of communication with said remote station.

9. The combination of claim 8 wherein said indicating means includes visual indicating means for providing an indication when said local data station is capable of automatic data communication and when said local data station is capable of manual data communication.

10. The combination of claim 9 wherein said visual indicating means comprises:

lamp means;

first energizing means coupled to said bistate means for generating a first energizing signal when said bistate means admits of said first state and said local data station is capable of communicating with said remote station;

second energizing means coupled to said bistate means and said storage means for generating a second energizing signal when said bistate means admits of said second state, said storage means selectively stores said first and second actuating signals and said local data station is capable of communicating with said remote station and;

means coupled to said first and second energizing means for selectively supplying said lamp means with said first and second energizing signals.

11. The combination of claim 10 further including:

additional lamp means for providing a visual indication of the termination of a data transmission;

activating means coupled to said detecting means for activating said additional lamp means upon detecting the termination of a data communication; and manually operable means for de-activating said additional lamp means in response to the manual operation thereof.

12. Data coupling apparatus for connecting a data device to a communication channel comprising:

first means responsive to a request signal representing a request by a remote device coupled to said communication channel to communicate with said data device for establishing a communication path between said data device and said communication channel;

second means responsive to the manual operation of switch means for establishing said communication path between said data device and said communication channel;

manually operable control means coupled to said first and second means and responsive to the operation of manual selecting means for enabling the selected operation of said first means or said second means; and enabling means responsive to the establishment of said communication path to enable the operation of said data device.

13. Data coupling apparatus in accordance with claim 12 wherein said communication path comprises:

data transmit means interconnected between said data device and said communication channel for transmitting data to said communication channel from said data device; and data receive means interconnected between said communication channel and said data device for supplying said data device with data transmitted over said communication channel.

14. Data coupling apparatus in accordance with claim 13 wherein said control means comprises:

bistate means admitting of a first and second state for supplying a first signal to said first means to enable the operation of said first means when said bistate means admits of said first state and for supplying a second signal to said second means to enable the operation of said second means when said bistate means admits of said second state; and indicating means coupled to said bistate means for indicating the state assumed by said bistate means.

15. Data coupling apparatus in accordance with claim 14 wherein said first means comprises first coincidence means for producing a first actuating signal when said request signal and said first signal are applied thereto in coinciding relationship.

16. Data coupling apparatus in accordance with claim 15 wherein said second means comprises second coincidence means for producing a second actuating signal when said second signal is applied thereto in coinciding relationship with the manual operation of said switch means.

17. Data coupling apparatus in accordance with claim 16 further including actuating means coupled to said first and second coincidence means and selectively responsive to said first and second actuating signals to connect said data transmit means and said data receive means to said communication channel.

18. Data coupling apparatus in accordance with claim 17 wherein said enabling means is coupled to said data device and initiates an operation of said data device in response to the connecting of said data transmit means and said data receive means to said communication channel.

19. Data coupling apparatus in accordance with claim 18 wherein said actuating means includes detecting means for detecting the termination of said operation of said data device for disconnecting said data transmit means and said data receive means from said communication channel.

20. Data coupling apparatus in accordance with claim 19 wherein said actuating means further includes means for inhibiting the disconnecting of said data transmit means and said data receive means when said bistate means admits of said second state.

* * * * *